(12) United States Patent
Eversole et al.

(10) Patent No.: US 9,745,222 B2
(45) Date of Patent: Aug. 29, 2017

(54) APPARATUS AND METHODS FOR PRODUCING GYPSUM WALLBOARD

(71) Applicant: United States Gypsum Company, Chicago, IL (US)

(72) Inventors: Leslie Eversole, Milton, PA (US); Scott DellAngelo, Plainfield, IL (US); Jason Lash, Valparaiso, IN (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 77 days.

(21) Appl. No.: 14/807,111

(22) Filed: Jul. 23, 2015

(65) Prior Publication Data

US 2017/0022104 A1 Jan. 26, 2017

(51) Int. Cl.

| | |
|---|---|
| *C04B 11/00* | (2006.01) |
| *B32B 37/14* | (2006.01) |
| *B28B 5/02* | (2006.01) |
| *B28B 17/00* | (2006.01) |
| *B28B 19/00* | (2006.01) |
| *G01B 11/26* | (2006.01) |
| *G01B 11/04* | (2006.01) |

(52) U.S. Cl.
CPC .............. *C04B 11/00* (2013.01); *B28B 5/027* (2013.01); *B28B 17/0081* (2013.01); *B28B 19/0092* (2013.01); *B32B 37/142* (2013.01); *G01B 11/046* (2013.01); *G01B 11/26* (2013.01)

(58) Field of Classification Search
CPC .............................. C04B 11/02; B32B 37/142
See application file for complete search history.

(56) References Cited

U.S. PATENT DOCUMENTS

| | | | |
|---|---|---|---|
| 6,494,609 B1 | 12/2002 | Wittbold et al. | |
| 6,986,812 B2 | 1/2006 | Dubey et al. | |
| 2009/0265127 A1* | 10/2009 | Floeder | D21G 9/0045 |
| | | | 702/82 |
| 2010/0247937 A1* | 9/2010 | Liu | C04B 28/14 |
| | | | 428/500 |

FOREIGN PATENT DOCUMENTS

| | | |
|---|---|---|
| EP | 0 496 968 A1 | 8/1992 |
| EP | 0 657 260 A1 | 6/1995 |
| EP | 1 132 710 A1 | 9/2001 |
| JP | S60 44811 A | 3/1985 |
| WO | WO 00/12963 | 9/2000 |

OTHER PUBLICATIONS

Hippler H P: Beruehrungslose Dimensionsmessung bei der Gipsplatten-Herstellung durch Laser-Messtechnik, ZKG International, vol. 43, No. 6, Jun. 1, 1990, pp. 306-309, XP000140637, SSSN: 0949-0205.

* cited by examiner

*Primary Examiner* — Daniel Lee
(74) *Attorney, Agent, or Firm* — Greer, Burns & Crain, Ltd.; Pradip Sahu; Philip T. Petti

(57) ABSTRACT

An apparatus for production of a gypsum product is provided which comprises a conveyer comprising a conveyer belt and means for rotating the conveyer belt; means for forming a gypsum product; and at least one laser scanner positioned over the conveyer belt at the location where the scanner scans at least one edge of the gypsum product which is at least partially set; and the laser scanner is in communication with a processor. Methods for forming a gypsum product with the apparatus are provided as well.

7 Claims, 5 Drawing Sheets

APPARATUS AND METHODS FOR PRODUCING GYPSUM WALLBOARD

TECHNICAL FIELD

This invention relates to an apparatus and method for producing a gypsum wallboard with standardized edge angles and width. The apparatus comprises a gypsum wallboard production line with at least one laser scanner and processor for monitoring edge angles and width of a gypsum wallboard in real time during manufacturing. The methods include measuring an edge angle and width of a gypsum wallboard during manufacturing in real time.

BACKGROUND

Gypsum products such as wallboards, partitions, tiles, ceiling panels and the like are widely used in building construction. These products are prepared from slurries in which calcined gypsum (calcium sulfate hemihydrate) is mixed with water and other ingredients. A wallboard is a gypsum product widely used in building construction and it is typically manufactured by formulating a gypsum slurry and sandwiching it between two sheets of paper on a wallboard production line.

A slurry mixer is typically used for supplying agitated gypsum slurry to the wallboard production line. Several types of gypsum wallboard manufacture are described in co-assigned U.S. Pat. Nos. 6,494,609 and 6,986,812; both of which are incorporated by reference.

A mixer is provided for uniformly dispersing calcined gypsum into water to form a slurry and to mix the slurry with other ingredients such as for example foam, and then the slurry is cast into a desired shaped mold or onto a paper surface or some mat to allow the slurry to set and form hardened gypsum by chemical reaction of the calcined gypsum with water. A lightweight gypsum product is produced by uniformly mixing aqueous foam into the slurry to generate air bubbles. This results in a uniform distribution of voids in the set gypsum product when the bubbles are confined in the slurry before the gypsum hardens.

During production on a wallboard production line, gypsum slurry is distributed from a mixer onto a first sheet of paper, called the facer, which is fed from a roll onto a conveyer belt. The slurry is spread over the facer and a second sheet of paper, called the backer, is fed from a roll on the gypsum slurry, and the sandwiched gypsum product continues to move on the conveyer belt. The sandwiched gypsum product is formed into a panel which then continues to move on the conveyer belt until gypsum is set enough for the panel to be transferred into a drying oven. The panel is then cut to size into a wallboard. When slurry is positioned on the facer, it should be distributed as evenly as possible between the central portion of the facer and its edges. The width of the gypsum panel should be also either constant or have only negligently minor deviations from the preset value. Many factors affect the quality of gypsum slurry distribution, including such as a temperature at which the production line operates, a composition of the gypsum slurry, the source of water and other ingredients in the slurry, paper used as a facer, paper used as a backer, and humidity. In some production methods, gypsum panels are trimmed on each side to produce a wallboard with perfectly straight edges. However, this method is very costly and generates a lot of waste.

PCT publication WO 2000/012963 describes a method and apparatus for detecting the edge angle of a gypsum board. The system comprises a light source and camera and requires pictures to be taken for obtaining information about slurry distribution in a gypsum board. However, this method requires several steps to be performed. For example, a picture should be taken, before the edge angle can be analyzed. Thus, there remains the need to constantly measure and monitor the edges and width of a gypsum panel during production.

SUMMARY

This invention provides an apparatus for production of a gypsum product which monitors the edges and width of a gypsum panel during production. The apparatus comprises a conveyer comprising a conveyer belt and means for rotating the conveyer belt, means for forming a gypsum product; and at least one laser scanner positioned over the conveyer belt at the location where the scanner scans at least one edge of the gypsum product which is at least partially set the laser scanner is in communication with a processor. In some embodiments, the laser scanner is a three-dimensional laser scanner. In at least some embodiments, the processor is equipped with a software which calculates an edge angle of the gypsum product and a deviation in the value of the edge angle from a pre-specified value for the edge angle. In some embodiments, the software is designed such that it produces at least one signal when the deviation is higher than 2%.

In some embodiments, the apparatus comprises two laser scanners; a first laser scanner positioned such that the first scanner can scan the left edge of the gypsum product as the gypsum product passes the first scanner and a second scanner positioned such that the second scanner can scan the right edge of the gypsum product as the gypsum product passes the second scanner. At least some embodiments include an apparatus in which the laser scanner is in communication with a processor wirelessly.

Further embodiments provide a method for producing a gypsum product. This method comprises the following steps: feeding a first sheet of paper on a conveyer belt; depositing gypsum slurry on the first sheet of paper; covering the gypsum slurry with a second sheet of paper; forming a gypsum panel; allowing the gypsum panel to set at least partially while the gypsum panel is moving on the conveyer belt; and scanning with a laser scanner at least one edge of the gypsum panel as it is moving on the conveyer belt and passes the location at which the laser scanner is located. In some embodiments, the laser scanner transmits scans to a processor, and the processor is equipped with a software which calculates the edge angle of the gypsum product and a deviation in the value of the edge angle calculated from a pre-specified value for the edge angle. The software generates a signal when the deviation is larger than the pre-specified value. Further methods include those in which a gypsum slurry can be reformulated in response to a signal provided by the software.

BRIEF DESCRIPTION OF THE DRAWINGS

FIG. 5A is a standard gypsum wallboard. FIGS. 5B and 5C depict non-standard wallboards.

DETAILED DESCRIPTION

This invention provides an apparatus and method for monitoring an edge angle and width of a wallboard during manufacturing in real time. The apparatus decreases significantly the production of non-standard wallboard and further decreases the amount of materials lost due to trimming and while setting up a production line for manufacturing a wallboard with new formulation. The system also improves a quality of the wallboard produced.

During construction, several wallboards are assembled together to form an interior wall in a building. Because two wallboards are joined together to form a seam, it is important that the two wallboards have standard edges that can be aligned together. It is also important that the width of a wallboard does not fluctuate because this would prevent two wallboards from properly aligning together.

Figure 1:
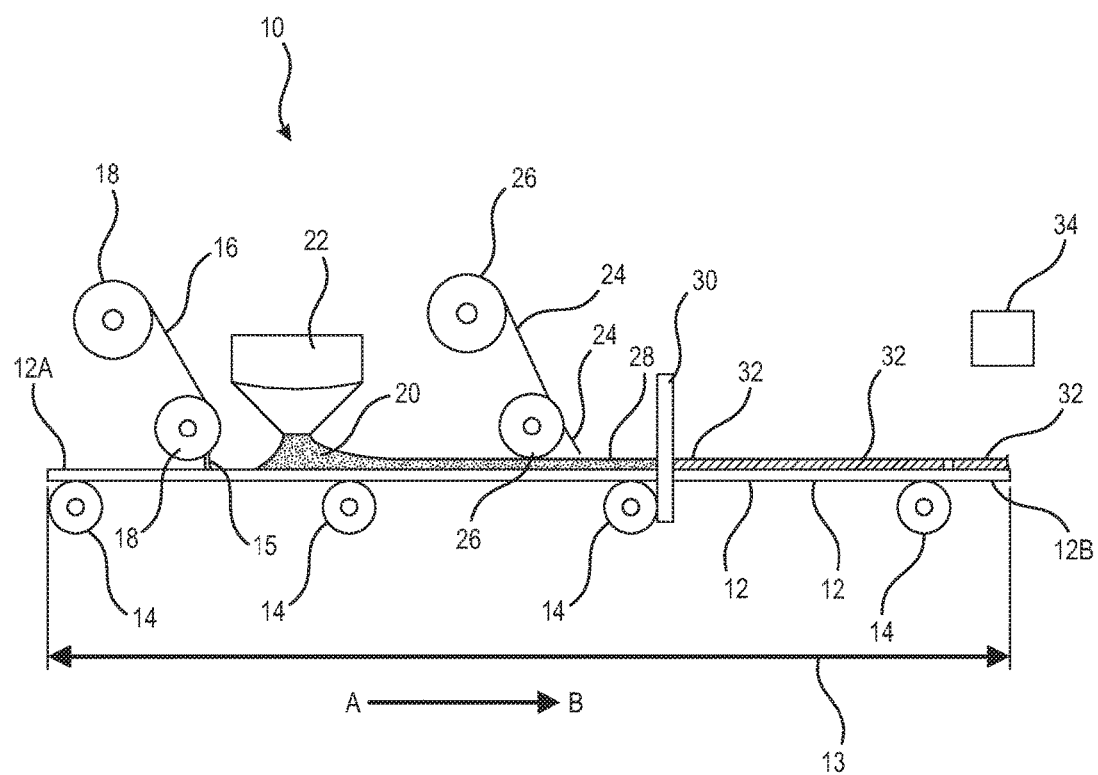
FIG. 1 is a side view of a partial gypsum wallboard production line, showing the positioning of a laser scanner.

Referring to FIG. 1, it depicts a side view of a wallboard production line, generally 10, which comprises a conveyer belt 12 moving in the direction A to B by a plurality of means 14. The length 13 of the conveyer belt 12 from the beginning of the conveyer belt 12A to the end of the conveyer belt 12B may vary. At least in some embodiments, the length 13 is calculated such that it is long enough for gypsum to at least partially set while a gypsum product is moving on the conveyer belt 12.

A first sheet of paper, the facer, 16 is fed on the conveyer belt 12 by means 18 at the beginning of the conveyer belt 12A or near the beginning of the conveyer belt 12A. Gypsum slurry 20 is deposited from a mixer 22 on the facer 16 as it continues to be moved on the conveyer belt 12 in the direction A to B. The gypsum slurry 20 is distributed on the facer 16 and a second sheet of paper, the backer, 24 is placed on top of the slurry 20 by means 26. The sandwiched gypsum product 28 is pressed and formed by means 30 and allowed to continue moving on the conveyer belt 12 until it sets into a gypsum panel 32. As the gypsum panel 32 continues to move on the conveyer belt 12 it becomes fully set and leaves the conveyer belt at the end of conveyer belt 12B.

At least one laser scanner 34 is positioned over and/or on at least one side of the conveyer belt 12. The laser scanner 34 can be positioned at any point over the length 13 of the conveyer belt 12. In some preferred embodiments, the laser scanner 34 is positioned right after the forming means 30. In more preferred embodiments, the laser scanner 34 is positioned anywhere over the conveyer belt 12 where the gypsum panel 32 is at least partially set. In the most preferred embodiments, the laser scanner 34 is positioned over the conveyer belt 12 at any point where the gypsum panel is substantially set. In some embodiments, the laser scanner 34 is positioned almost at the end the conveyer belt 12B. In further embodiments, the laser scanner 34 is positioned anywhere between the point at which a gypsum product at least partially set and the end of the conveyer belt 12B. While in some embodiments only one laser scanner 34 is used, in other embodiments two laser scanners 34 are used. In other embodiments several laser scanners 34 are used.

Figure 2:
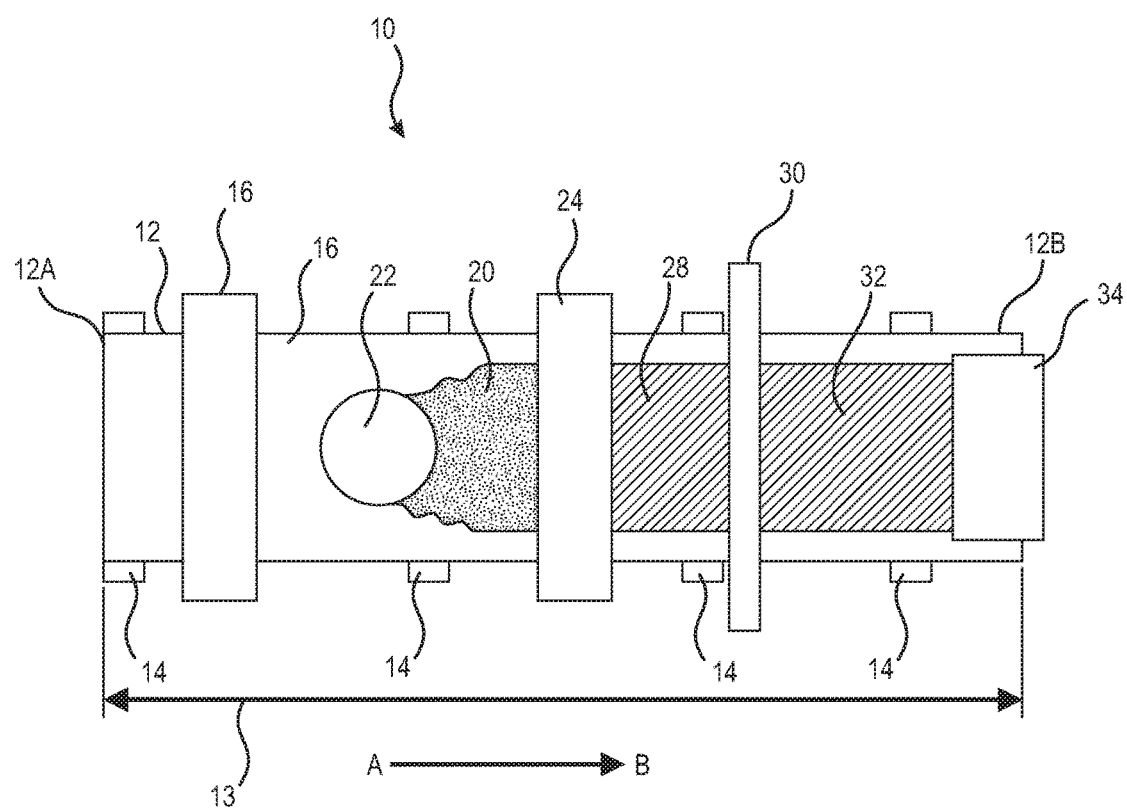
FIG. 2 is an elevation view of a partial gypsum wallboard production line, showing the positioning of a laser scanner.

FIG. 2 is an elevation view of a partial gypsum wallboard production line, generally 20, showing the positioning of a laser scanner 34. A conveyer belt 12 is moving in the direction A to B by means 14. The length 13 of the conveyer belt 12 from the beginning of the conveyer belt 12A to the end of the conveyer belt 12B may vary. At least in some embodiments, the length 13 is calculated such that it is long enough for gypsum to at least partially set while moving on the conveyer belt 12.

As shown in FIG. 2, a first sheet of paper, the facer, 16 is fed on the conveyer belt 12 at the beginning of the conveyer belt 12A or near the beginning of the conveyer belt 12A. Gypsum slurry 20 is deposited from a mixer 22 on the facer 16 as it continues to be moved on the conveyer belt 12 in the direction A to B. The gypsum slurry 20 is distributed on the facer 16 and a second sheet of paper, the backer, 24 is placed on top of the slurry 20. The sandwiched gypsum product 28 is pressed and formed by means 30 and allowed to continue moving on the conveyer belt 12 until it sets into a gypsum panel 32.

As the gypsum panel 32 continues to move on the conveyer belt 12, it becomes fully set and leaves the conveyer belt at the end of conveyer belt 12B. FIG. 2 provides an embodiment in which a laser scanner 34 is positioned over the conveyer belt 12 and near the conveyer belt end 12B. It will be appreciated that in other embodiments, two laser scanners, one for each edge of the gypsum panel, can be positioned over the conveyer belt. In further embodiments, at least one laser scanner can be positioned on each side of the conveyer belt. The location of the laser scanner can also vary. In some embodiments, the laser scanner 34 can be positioned very closer to the forming means 30. In other embodiments, the laser scanner 34 can be positioned further away from the forming means 30 and closer to the end 12B. In further embodiments, the laser scanner 34 can be positioned at any location from which it can scan at least one edge of a gypsum panel. In further embodiments, the laser scanner 34 can be positioned at any location over the conveyer belt from which the laser scanner 34 can scan at least one edge of a gypsum panel in which gypsum is at least partially set.

Figure 3:
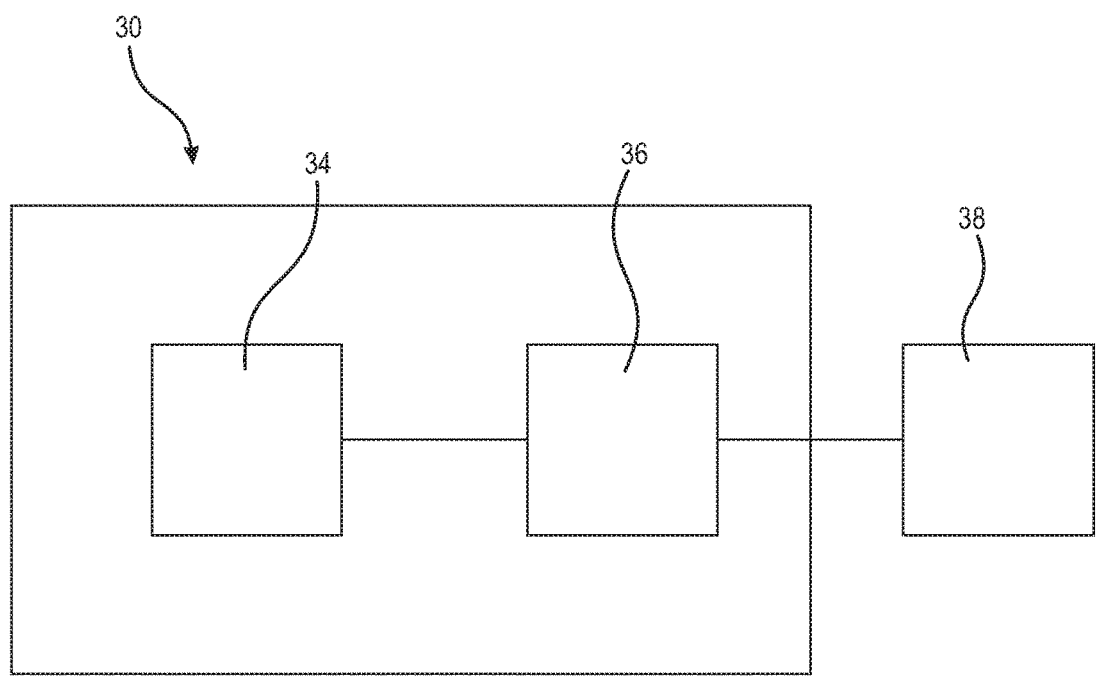
FIG. 3 is a schematic of a 3D laser scanner.

A laser scanner 34 can be any laser scanner. In some embodiments, the laser scanner is a three-dimensional (3D) laser scanner, generally 30, which comprises a laser source 34 and sensor 36 which is in communication with a data processor 38 as shown in FIG. 3. The laser source 34 emits laser and scans a gypsum product as it is moving on the conveyer belt and passes the location at which the laser scanner is positioned. The sensor 36 captures scans and transmits this data to the data processor 38 which transforms the data into a digital three-dimensional model of the scanned object.

Figure 4:
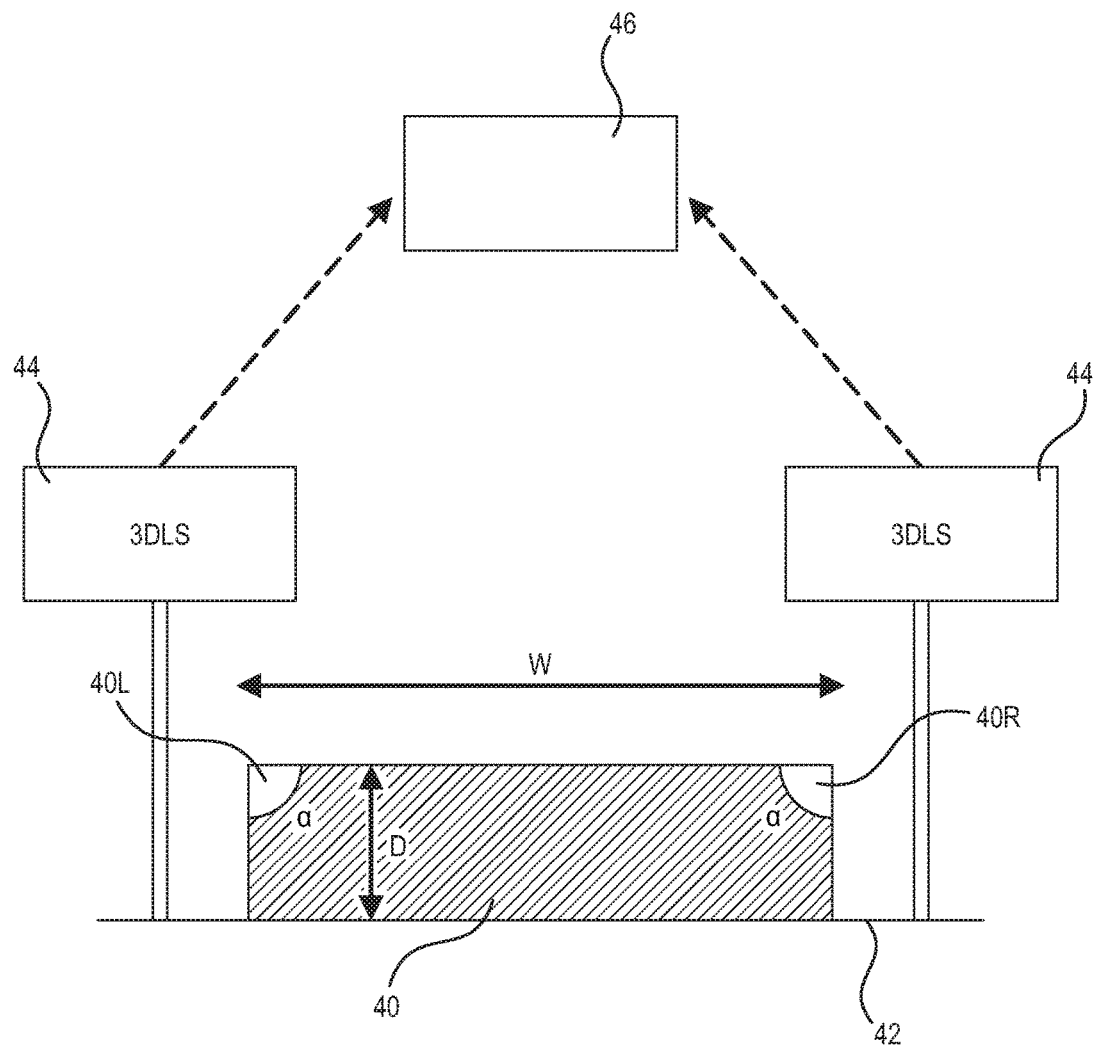
FIG. 4 is a cross-sectional view of a partial wallboard production line, showing the positioning of two laser scanner.

FIG. 4 depicts a cross-sectional view of a gypsum panel 40 with the left edge 40L and the right edge 40R on a conveyer belt 42. Two 3D laser scanners 44 are also shown. The first 3D laser scanner 44 is positioned such that it can scan continuously the left edge 40L of the gypsum panel 40 as it is moving on the conveyer belt 42 and passing the location at which the first 3D laser scanner 44 is positioned. The first 3D laser scanner 44 collects and transmits data about the left edge 40L to a processor 46 which is equipped with software that analyzes the scans and calculates angle $\alpha$ which is the angle between the backer on top of the gypsum slurry and gypsum slurry, as can be appreciated in FIG. 4. As can be also appreciated from a cross-sectional view in FIG. 4, each gypsum panel has two edges, one on the left side of the gypsum panel and the other one the right side of the gypsum. These two edges can be referred to as the left edge and the right edge.

The second 3D laser scanner 44 is positioned such that it can scan continuously the right edge 40R of the gypsum panel 40 as it is moving on the conveyer belt 42. The second 3D laser scanner 44 collects and transmits data about the right edge 40L to a processor 46 which is equipped with software that analyzes the scans and calculates angle α. In some embodiments scanners 44 transmit data to the processor 46 wirelessly. In some embodiments, scanners 44 are connected to the processor 46 with a wire. In further embodiments, the processor 46 is located at some remote location. For example, the processor 44 can be a portable mobile device which permits monitoring production of wallboard remotely. In further embodiments, the processor is built in the 3D laser scanner 44 and is constitutes a part of the laser scanner 44. The software can calculate angle α in real time and determine whether it complies with a pre-set standard value for angle α. It will be appreciated that scanner 44 can also scan, collect and transmit data about the width (W) of the gypsum product, the thickness (D), the of the gypsum product and any other geometric parameters that need to be monitored in production of a wallboard to avoid manufacturing of non-standard wallboard. At least several parameters such as for example, edge angle and width of a gypsum panel can be monitored at the same time with a laser scanner.

Figure 5A:
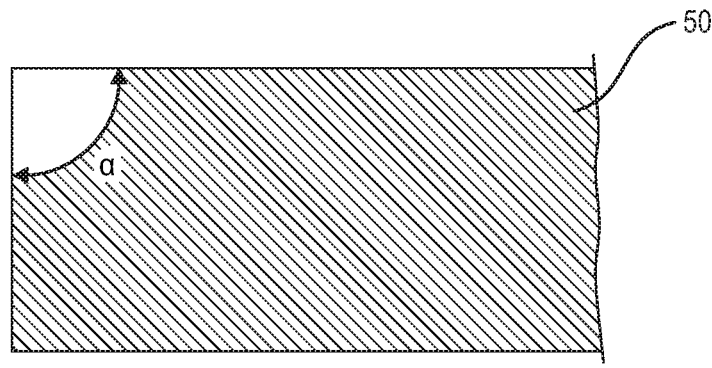
FIGS. 5A-5C depict cross-sectional views of gypsum wallboards.

As shown in FIG. 5A, at least in some embodiments a wallboard 50 to be produced must have a certain edge angle α. As can be seem from FIG. 5A, only the left edge of the wallboard 50 is shown. A person of skill would appreciate that the complete wallboard will have the right edge and the left edge, which are created by the backer and gypsum under the backer. Both edges, left and right should comply with the same specify value.

Figure 5B:
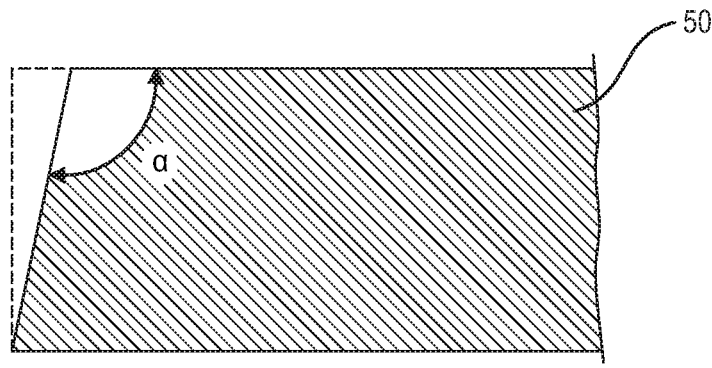
Figure 5C:
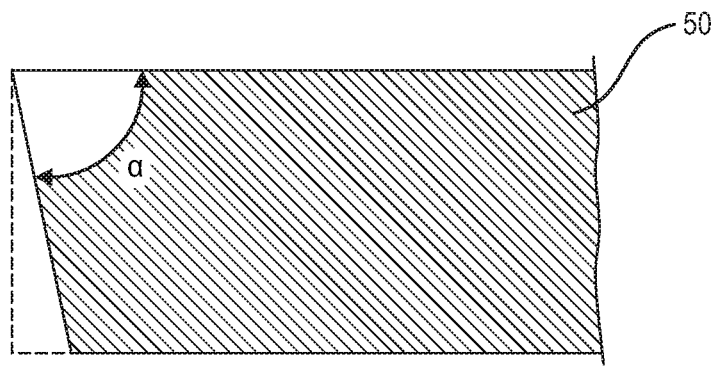

For example, the specified angle α in FIG. 5A is a 90° angle. However, during production of the wallboard 50, the actual value of α may deviate from 90° as shown in FIGS. 5B and 5C because of various parameters which may affect the distribution of gypsum slurry between the facer and the backer.

In a method of one embodiment as discussed in connection with FIG. 4, a 3D scanner scans a gypsum board edge and transmits scans to a processor which is equipped with software that analyzes the gypsum panel edge and calculates a deviation value from the pre-specified value for α. For example, if a wallboard to be produced should have a specified 90° angle, the processor can calculate a deviation from a 90° angle. The processor can be further equipped with software which triggers a signal if a deviation from a pre-specified value for α is higher than a certain threshold.

In one embodiment, a deviation of more than 1% from a pre-specified value for α can trigger a signal. In other embodiment, a deviation of more than 2% from a predetermined value for α can trigger a signal. In further embodiment, a deviation of more than 3% from a pre-specified value for α can trigger a signal. In further embodiment, a deviation of more than 3% from a pre-specified value for α can trigger a signal. In further embodiment, a deviation of more than 5% from a pre-specified value for α can trigger a signal.

Various threshold signals can be generated and include, but are not limited to, a sound signal and/or a visual signal on at least one monitor. At least in some embodiments, the processor can be in direct communication with a controller on a production line and can trigger stopping of the production line if a deviation from the pre-specified value for α is higher than what is allowed in production of standard gypsum products.

It will be appreciated that while FIG. 5 depicts an embodiment in which the specified angle α is a 90° angle, the system with a laser scanner can be set for monitoring any wallboard edges, including wallboards with double edges and boards in which a specified value of α is different from 90°.

A person of skill will appreciate significant savings in time and materials which can be achieved by a present method which uses a wallboard production line with a laser scanner comprising a laser source and laser sensor in communication with a processor. One of the advantages for the method is the positioning of the laser scanner where the laser scanner scans the edge of a gypsum product which is at least partially set while the gypsum product is moving on the conveyer belt and passes the position at which the laser scanner is located. Other advantages include accurate real time measurements obtained for a three-dimensional product such as wallboard.

The present method permits identifying a production problem as soon as it develops, which in turn allows to avoid accumulation of non-standard products which do not comply with a specification and which have to be recycled. Thus, significant savings materials and energy are achieved. Further and because the method permits measurements in real time, time savings are also achieved.

Further embodiments provides an apparatus and method for monitoring distribution of gypsum slurry. In this method, the left edge, the right edge and width of a gypsum product are scanned with a laser scanner and analyzed for complies with a pre-specified value for the edge angle. If deviations are detected, the production can stopped and a gypsum slurry can be reformulated to permit a more even distribution and/or shorter or longer setting time when formed in a gypsum product.

What is claimed is:

1. A method for producing a gypsum product, the method comprising:
   feeding a first sheet of paper on a conveyer belt;
   depositing gypsum slurry on the first sheet of paper;
   covering the gypsum slurry with a second sheet of paper;
   forming a gypsum panel;
   allowing the gypsum panel to set at least partially while the gypsum panel is moving on the conveyer belt; and
   scanning with a laser scanner at least one edge of the gypsum panel as it is moving on the conveyer belt and passes the location at which the laser scanner is located;
   wherein the laser scanner transmits scans to a processor, and the processor is equipped with a software which calculates an edge angle of the gypsum product and a deviation in the value of the edge angle calculated from a pre-specified value for the edge angle; and
   wherein if the calculated deviation is larger than a pre-specified value, the gypsum slurry is reformulated to even its distribution between the first sheet of paper and the second sheet of paper.

2. The method of claim 1, wherein the laser scanner is a three-dimensional laser scanner.

3. The method of claim 1, wherein the laser scanner transmits scans to a processor wirelessly.

4. The method of claim 1, wherein the laser scanner transmits scans to a processor and the processor is equipped with a software which calculates an edge angle of the gypsum product and a deviation in the value of the edge angle from a pre-specified value for the edge angle and wherein the pre-specified value is 90°.

5. The method of claim 1, wherein the laser scanner transmits scans to a processor, and the processor is equipped with a software which calculates an edge angle of the gypsum product and a deviation in the value of the edge angle from a pre-specified value for the edge angle, and wherein the software generates a signal when the deviation is larger than the pre-specified value.

6. The method of claim 1, wherein the laser scanner transmits data about the left and the right edges of the gypsum panel.

7. The method of claim 1, wherein the laser scanner transmits scans of at least one edge and the width of the gypsum panel to a processor.

* * * * *